June 3, 1930.    H. H. MOSS    1,760,883
STRUCTURAL JOINT AND METHOD OF MAKING THE SAME
Filed Feb. 6, 1926
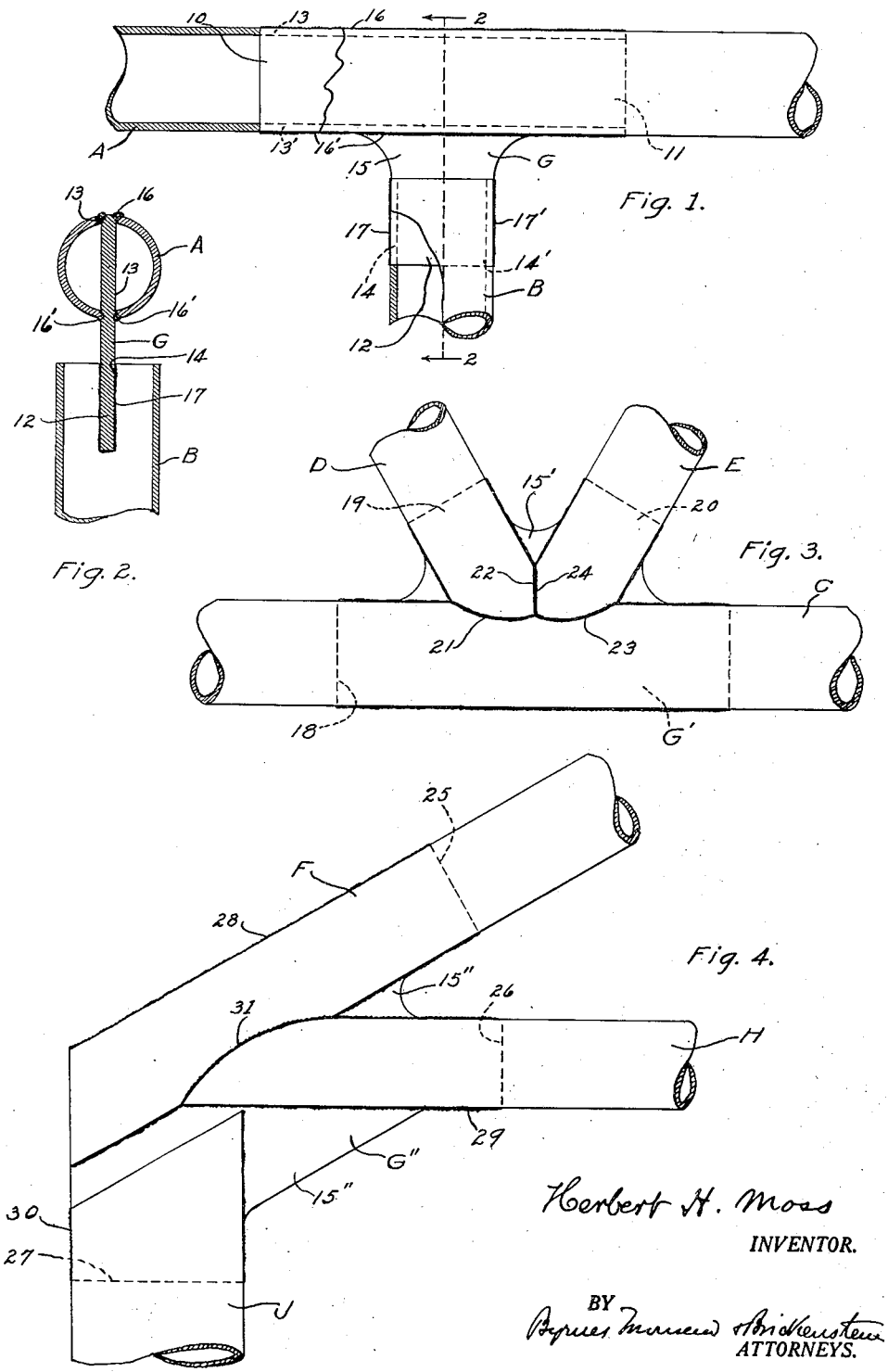
Herbert H. Moss
INVENTOR.
BY
Byrnes, Manard & Brickenstein
ATTORNEYS.

Patented June 3, 1930

1,760,883

UNITED STATES PATENT OFFICE

HERBERT H. MOSS, OF BROOKLYN, NEW YORK, ASSIGNOR TO THE LINDE AIR PRODUCTS COMPANY, A CORPORATION OF OHIO

STRUCTURAL JOINT AND METHOD OF MAKING THE SAME

Application filed February 6, 1926. Serial No. 86,448.

This invention relates to welded joints and an improved method of joining tubular metal shapes by high-temperature fusion welding. While the improved joint and the herein disclosed method of making it are particularly applicable in joining tubular structural shapes, it will be understood that certain features of this invention are of more general utility.

Heretofore, in weld-uniting tubular metal shapes it has been the practice to bevel or otherwise form the ends of the tubular members so they closely fit together and then to apply weld metal at the corners where they abut. A joint produced by this operation of welding is no stronger than the connecting circumferential welds, and such welds are frequently compounded, leaving weakening residual stresses in the finished structures. Proper penetration of the weld is also difficult to secure at all points. Such joints are not self-supporting and can not be universally applied; the stresses are neither centralized nor evenly distributed, and are usually transferred solely through weld metal of uncertain strength.

The primary object of this invention is to eliminate these and other difficulties encountered in joining tubular and other structural members and to produce a fushion-welded joint which is at least as strong as the joined members. Other objects are to provide a joint of general application which may be easily assembled and welded; which may be prepared in the shop or in the field; and one in which the stresses are substantially symmetrical with a plane through the axes of the joined members and are transferred, partially at least, by non-rigid metal which has not been weakened by the intense heat of the welding operation.

The objects and novel features of this invention will be more clearly understood from the following description taken with the drawings, in which:

Fig. 1 is a view of a joint embodying principles of this invention;

Fig. 2 is a sectional view of the joint, taken along the line 2—2 of Fig. 1; and Figs. 3 and 4 illustrate other joints made in accordance with the principles of this invention.

Broadly speaking, the improved joint comprises a gusset plate having portions thereof inserted in and welded to the edges of slots in the members to be joined, the gusset plate being disposed in the plane of the axes of said members and having webs for transferring the stresses from one member to another. An advantageous method of constructing this improved joint comprises appropriately cutting or otherwise forming the structural members to be joined to provide holes or slots therein adapted to receive portions of a metal connector or gusset plate; inserting such gusset plate in place; and then by means of fushion welding or brazing, uniting such gusset plate to said members along the edges of said slots. The end of a tube terminating at a joint is desirably also shaped to abut at all points against the exterior surface of a main tubular member to which it is to be joined, such shaped end being profile welded to said exterior surface in known manner. The particular form of the gusset plate is dependent upon the manner in which one or more tubular members enter or terminate at a joint, but in the main the principle of construction is one that provides adequate web or gusset metal to distribute or transfer the stresses in the several tubular members to be joined and affords sufficient gusset plate edge metal fitting in the slots in the several tubular members to be joined, to develop a welded joint strength equal to or in excess of the stresses carried by the respective structural members at the joint. The gusset plate is desirably disposed in the plane of the axes of the members which it unites so that the completed joint assembly has all members or parts thereof concentric with respect to their theoretical center lines of force or gravity. Furthermore, the portions or extensions of the gusset plate which are welded into the slots also bridge the space between each pair of slots, thereby stiffening or reinforcing each member and the joint as a whole. The welds which integrally unite the gusset plate to the members may be formed by depositing suitable metallic material or welding rod fused by high-temperature heating means, such as an oxy-acetylene flame or an electric arc, or in accordance with the high-temperature brazing method disclosed in U. S. Patent No. 1,620,324, granted March 8, 1927, on an application of Glenn O. Carter.

Referring to Figs. 1 and 2, for purposes of illustration my invention is shown as applied to the formation of a joint between two tubular structural shapes, such as the iron or steel pipes or tubes A and B, but it will be understood that certain features of this invention are applicable in joining other structural metallic shapes. The tube B is perpendicularly joined to the tube A at a point intermediate the ends of the latter by a substantially T-shape gusset plate G which has alined projections 10 and 11 welded to the tube A and a projection 12 perpendicular to 10, 11 and welded to the tube B. To receive the part of the gusset plate comprising the projections 10, 11, the tube A has a pair of diametrically opposite longitudinal slots 13, 13' formed therein in any suitable way, and desirably of sufficient dimensions to receive the portion of the gusset plate that is inserted therein. The tube B is provided with a pair of diametrically opposite longitudinal slots 14, 14', which are similar to the slots 13, 13', except that the slots 14, 14' are open at one end of the tube and extend inwardly from said end, so that the tubes may be joined perpendicular to one another.

The tubes and gusset plate are assembled as shown, with the projections 10, 11 and 12 abutting against the ends of the respective slots desirably, though not necessarily, leaving a web section 15 of the gusset plate between the tubes. This web section desirably has rounded edges merging without sharp angles into the adjoining edges of the projections 10, 11 and 12. The projections 10, 11 and 12 bridge the spaces within the tubes between the respective pairs of slots 13, 13' and 14, 14', thereby reinforcing these parts of the tubes. The edges of these projections lie in the slots, either flush with or slightly below the outer surfaces of the tubes, and are integrally united to the tubes along the edges of such slots, as by oxy-acetylene or electric arc welding. I prefer to weld such edges together by fusion depositing weld metal along them, thereby producing welds 16, 16', 17, 17'.

A welded joint of ample strength is thus produced in which the gusset plate is disposed in a plane through the axes of the tubular members and a symmetrical relation of the elements is maintained. In practice, the several elements may be formed, shaped and cut in the shop, according to specifications; and the proper gusset plates may be welded in the shop to certain of the tubes, leaving for the field work only the final assembly and but a part of the welding in the structure.

It will be apparent that where the tubes are to be disposed substantially parallel to one another, both tubes may be slotted like the tube A, whereas in an angular joint the slots 14 and 14' will be of unequal length, and in both instances the shape of the gusset plate will be modified to conform to the particular angularity of the tubes joined thereby. Figs. 3 and 4 illustrate other type of joints which also embody the principles of my invention as disclosed in the single lateral connection shown in Figs. 1 and 2.

Fig. 3 illustrates a connection in which two secondary tubular members D and E are joined to a principal tubular member C. Here, the gusset plate G' is shaped to provide projections 18, 19 and 20, separated by a web 15', and the tubes C and D, E are slotted similarly to the tubes A and B, respectively, the respective slots receiving the sections 18, 19, 20, which are welded to the tubes along edges of such slots as already described. The ends of the tubes D and E are cut or otherwise formed to fit around the exterior of the tube C, as indicated by the edges 21 and 23, which lie in contact with the tube C while edges 22 and 24 abut. Weld metal is deposited along edges 21, 23 and 22, 24 on both sides of the joint to provide a profile weld at the ends of tubes D and E, which is supplemented by the inserted plate G'.

Fig. 4 illustrates the heel of a truss embodying a joint made in accordance with my invention. Here, the tubular rafter member F, the tubular chord member H and the tubular column member J are each provided with a pair of diametrically opposite slots extending inwardly from the ends thereof which terminate at the heel. The gusset plate G'' is appropriately shaped to provide sections or projections 25, 26, 27 respectively fitting the several pairs of slots, and webs 15'' between such members. The members are welded to the gusset plate G'', in the manner already described, producing welds 28, 29, 30 along the edges of said slots and providing a built-up structure in which the gusset plate is disposed in a plane through the axes of the three members. The lower horizontal edge of the vertical gusset plate G'' may engage the lower edges of the slots in the column J and thus support the heel of the truss directly upon and symmetrically to the column. The end of the tubular member H may be beveled, as at 31, so that it closely fits the member F, the edge 31 being then welded to the member F where it engages the latter on both sides of the joint, thus providing a profile weld that is supplemented by the inserted plate. A similar connection to a column below the upper end of the latter may be made by forming diametrically opposite slots at the particular location on the column where the truss or other member is to be mounted. Furthermore, the column J may be other than of tubular shape, for example it may be built up of structural steel shapes such as angles, channels, and plates to form a hollow rectangular column or a column of other shape, and the herein disclosed structural joint may be utilized in joining sub members thereto. The riveting of gusset plates to the several members is thus eliminated.

While my improvements have been described in detail, it is to be understood that various changes may be made in the shapes, dimensions and other features of the structures shown without departing from the spirit of this invention or sacrificing its advantages.

I claim:

1. The combination with tubular members provided with openings in the walls thereof, of a rigid stress-transferring connector having portions disposed in said openings and welded to each of said members.

2. The combination of tubular structural members provided with longitudinally extending slots; and a connector comprising a plate having portions disposed in said slots and welded to said members along the edges of such slots.

3. The combination of tubular structural members provided with longitudinally extending slots disposed in a plane through the principal axes of said members; a gusset plate having portions disposed in said slots, with edges of such portions coextensive with such slots; and weld metal deposited along said edges and slots and uniting said plate to said members.

4. The combination of a tubular structural member having diametrically opposite slots extending inwardly from one end thereof; another tubular structural member having diametrically opposite slots therein; and a gusset plate having portions in said slots and welded to said members along the edges of said slots.

5. The combination of tubular structural members, each provided with a pair of oppositely disposed slots; and a shaped gusset plate welded to said members and having projections, each projection extending into a pair of said slots and bridging the space within each member between the slots therein.

6. The combination defined in claim 5, wherein all of said slots are disposed in a plane through the axes of said members; edges of said projections are coextensive with said slots and welded to edges of the latter; and the end of one of said members is profile welded to the other.

7. A structural member comprising a plurality of tubular portions and a joining means cooperating therebetween comprising a gusset plate inserted in slots in said tubular members in a diametral position and weld metal joining said gusset plate to said tubular members at diametrically opposite points, and additional weld metal joining said tubular portions directly placed along the contour lines of the intersection of said tubular members.

8. A structural member comprising a plurality of tubular portions having diametral slots therein and a gusset plate member spanning the diameter of said tubular portions, inserted in said slots and welded therein, said plate being means for joining said tubular members together, and for simultaneously reinforcing said tubular member at points of maximum stresses.

9. A structural device comprising a plurality of tubular members having slots therein, and joined at an angle, and a gusset plate welded within said slots having portions spanning the diameter of said respective tubes and having other portions forming strengthening fillets at the angles between said tubes.

10. A structural device comprising a plurality of tubular members having an integral, diametral, reinforcing and supporting plate at portions thereof, adapted to unite the respective tubular members.

11. A structural device comprising a plurality of tubular members, an integral plate having portions thereof extending diametrically between the opposed walls of each individual member and joined to the walls of all of said members along the line of contact between the plate and the members.

12. The combination of a tubular column member and a tubular truss member having a pair of diametrically opposite vertical slots in the end of each of said members, and a plate extending through said members into said slots and welded to said members along the edges of such slots.

In testimony whereof, I affix my signature.

HERBERT H. MOSS.